United States Patent
Cesare et al.

(12) 
(10) Patent No.: US 6,748,389 B1
(45) Date of Patent: Jun. 8, 2004

(54) METHOD, SYSTEM, AND PROGRAM FOR INVERTING COLUMNS IN A DATABASE TABLE

(75) Inventors: Mark Anthony Cesare, San Francisco, CA (US); Julie Ann Jerves, Saratoga, CA (US); Richard Henry Mandel, III, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/400,690

(22) Filed: Sep. 21, 1999

(51) Int. Cl.⁷ .............................................. G06F 17/30
(52) U.S. Cl. ........................ 707/100; 707/4; 707/104.1
(58) Field of Search .................... 707/1–10, 100–104.1; 709/214–215

(56) References Cited

U.S. PATENT DOCUMENTS

| | | | |
|---|---|---|---|
| 4,876,733 A | 10/1989 | Lavin .......................... 382/205 |
| 4,930,071 A | 5/1990 | Tou et al. ....................... 707/4 |
| 5,196,924 A | 3/1993 | Lumelsky et al. ........... 348/674 |
| 5,282,147 A | 1/1994 | Goetz et al. .................... 716/2 |
| 5,299,304 A | 3/1994 | Williams et al. ............ 707/523 |
| 5,321,797 A | 6/1994 | Morton ........................ 345/604 |
| 5,367,675 A | 11/1994 | Cheng et al. ................... 707/2 |
| 5,548,749 A | 8/1996 | Kroenke et al. ............ 707/102 |
| 5,548,754 A | 8/1996 | Pirahesh et al. ................ 707/2 |
| 5,548,755 A | 8/1996 | Leung et al. ................... 707/2 |
| 5,548,758 A | 8/1996 | Pirahesh et al. ................ 707/2 |
| 5,560,005 A | 9/1996 | Hoover et al. ................ 707/10 |
| 5,584,024 A | 12/1996 | Schwartz ........................ 707/4 |
| 5,588,150 A | 12/1996 | Lin et al. ........................ 707/1 |
| 5,590,321 A | 12/1996 | Lin et al. .................... 549/349 |
| 5,590,324 A | 12/1996 | Leung et al. ................... 707/5 |
| 5,598,559 A | 1/1997 | Chaudhuri ..................... 707/2 |
| 5,615,361 A | 3/1997 | Leung et al. ................... 707/3 |
| 5,687,362 A | 11/1997 | Bhargava et al. .............. 707/2 |
| 5,694,591 A | 12/1997 | Du et al. ........................ 707/2 |
| 5,701,454 A | 12/1997 | Bhargava et al. .............. 707/2 |
| 5,724,570 A | 3/1998 | Zeller et al. .................... 707/3 |
| 5,724,575 A | 3/1998 | Hoover et al. ................ 707/10 |
| 5,737,592 A | 4/1998 | Nguyen et al. ................. 707/4 |
| 5,742,806 A | 4/1998 | Reiner et al. ................... 707/3 |
| 5,765,167 A * | 6/1998 | Kiuchi et al. ............... 707/200 |
| 5,905,982 A | 5/1999 | Carey et al. .................... 707/4 |
| 6,014,670 A * | 1/2000 | Zamanian et al. .......... 707/101 |
| 6,298,342 B1 * | 10/2001 | Graefe et al. ............... 707/101 |

FOREIGN PATENT DOCUMENTS

| | | |
|---|---|---|
| JP | 7182179 | 7/1995 |
| JP | 7244603 | 9/1995 |
| JP | 8241330 | 9/1996 |
| JP | 9179882 | 7/1997 |
| WO | 9636003 | 11/1996 |

OTHER PUBLICATIONS

*Design and Implementation of Derivation Rules in Information Systems,* by R. Winter. Data & Knowledge Engineering, vol. 26, (1998), pp. 225–241.

*Realizing Object–Relational Databases by Mixing Tables with Objects.,* by C. Liu, et al. CRC for Distributed Systems Technology, School of Information Technology, The University of Queensland, Brisbane, Australia, pp. 335–346.

(List continued on next page.)

*Primary Examiner*—Shahid Alam
*Assistant Examiner*—Jean Bolte Fleurantin
(74) *Attorney, Agent, or Firm*—David W. Victor; Konrad, Raynes & Victor LLP

(57) ABSTRACT

Disclosed is a method, system, program, and data structure for transforming an input table. The input data table is comprised of multiple columns and rows. For each column, the data from one column in the input table is copied into one row in an output table to invert the input table.

22 Claims, 8 Drawing Sheets

OTHER PUBLICATIONS

*SuperSQL: An Extended SQL for Database Publishing and Presentation.*, by M. Toyama. Department of Information and Computer Science, Keio University, Yokohama, JP, pp. 584–586.

*A Starburst is Born,* by G. Lapis, et al. IBM Almaden Research Center, San Jose, CA. 1 page.

*Datalog Rule Evaluation in Associative Computers and Massively Parallel SIMD Machines,* by O. Cho, et al. Department of Computer Science, The University of Queensland, Brisbane, Australia, pp. 56–.

*Framework for Query Optimization in Distributed Statistical Databases,* by Sadreddini, M.H., et al. Information and Software Technology, vol. 34, No. 6, Jun. 1992, pp. 363–377.

ACM, 1983. Incomplete Information and Dependencies in Relational Databases* (*Preliminary Version), by T. Imielinski. Sigmod Record Issue Vo. 13, No. 4, pp. 178–184.

*Abstraction in Query Processing,* by T. Imielinski. Journal of the Association for Computing, vol. 38, No. 3, Jul. 1991, pp. 534–558.

International Business Machines Corporation, IBM's Data Mining Technology, White Paper; Data Management Solutions,(c) 1996.

International Business Machines Corporation, IBM Visual Warehouse for Windows NT, Managing Visual Warehouse, (c) 1998.

IBM Technical Disclosure Bulletin, Efficient Logging of Transactions on Persistent Information tin General and Data bases in Particular, Vol 40,No. 11, Nov. 1997 (c) 1997; PP. 117–120.

IBM Technical Disclosure Bulletin, Transformation of an Entity–Relationship Model into a System Object Model, Nov., 1994, pp. 631–634.

IBM Technical Disclosure Bulletin, Branch Set Preserving Transformations of Hierarchical Data Structure, vol. 23, No. 7B, Dec. 1980, (c) 1980; pp. 3090–3094.

IBM Technical Disclosure Bulletin, Intelligent Miner, vol. 40, No. 02, Feb., 1997; pp. 121–125.

* cited by examiner

200

| WEEK OF DATE | CAMPBELL DOUBLE | CUPERTINO DOUBLE | LOS GATOS DOUBLE | MILL VALLEY DOUBLE |
|---|---|---|---|---|
| 1997-01-01 | 296,539 | 352,231 | 306,889 | 475,236 |
| 1997-01-08 | 244,532 | 304,232 | 254,125 | 402,128 |
| 1997-01-15 | 302,879 | 398,700 | 353,223 | 411,012 |

202

210

| ORDER INTEGER | LOCATION CHAR | 1997-01-01 DOUBLE | 1997-01-08 DOUBLE | 1997-01-15 DOUBLE |
|---|---|---|---|---|
| 1 | CAMPBELL | 296,539 | 244,532 | 302,879 |
| 2 | CUPERTINO | 352,231 | 304,232 | 398,700 |
| 3 | LOS GATOS | 306,889 | 254,125 | 353,223 |
| 4 | MILL VALLEY | 475,236 | 402,128 | 411,012 |

| SHELF ITEM | COST | UNITS | TOTAL |
|---|---|---|---|
| CHAR | DOUBLE | INTEGER | DOUBLE |
| TOFU | .99 | 37 | 36.63 |
| SOY MILK | 1.29 | 96 | 123.84 |
| TAMARI | 2.29 | 24 | 54.96 |
| MISO | 3.19 | 9 | 28.71 |
| TEMPEH | 2.99 | 18 | 53.82 |

252

260

| LINE ITEM | TOFU | SOY MILK | TAMARI | MISO | TEMPEH |
|---|---|---|---|---|---|
| CHAR | DOUBLE | DOUBLE | DOUBLE | DOUBLE | DOUBLE |
| COST | .99 | 1.29 | 2.29 | 3.19 | 2.99 |
| UNITS | 37 | 96 | 24 | 9 | 18 |
| TOTAL | 36.63 | 123.84 | 54.96 | 28.71 | 53.82 |

FIG. 7

METHOD, SYSTEM, AND PROGRAM FOR INVERTING COLUMNS IN A DATABASE TABLE

CROSS-REFERENCE TO RELATED APPLICATIONS

This application is related to the following co-pending and commonly-assigned patent applications, all of which are filed on the same date herewith, and which are incorporated herein by reference in their entirety:

"Method, System, Program, And Data Structure for Transforming Database Tables," to Mark A. Cesare, Tom R. Christopher, Julie A. Jerves, Richard H. Mandel III, and having U.S. application Ser. No. 09/400,507;

"Method, System, Program, And Data Structure for Pivoting Columns in a Database Table," to Mark A. Cesare, Julie A. Jerves, and Richard H. Mandel III, and having U.S. application Ser. No. 09/400,057;

"Method, System, Program, and Data Structure for Cleaning a Database Table," to Mark A. Cesare, Tom R. Christopher, Julie A. Jerves, Richard H. Mandel III, and having U.S. application Ser. No. 09/399,694; and "Method, System, Program, And Data Structure For Cleaning a Database Table Using a Look-up Table," Mark A. Cesare, Julie A. Jerves, and Richard H. Mandel III, and having U.S. application Ser. No. 09/401,006.

BACKGROUND OF THE INVENTION

1. Field of the Invention

The present invention relates to a method, system, program, and data structure for inverting rows and columns in a database table.

2. Description of the Related Art

Data records in a computer database are maintained in tables, which are a collection of rows all having the same columns. Each column maintains information on a particular type of data for the data records which comprise the rows. A data warehouse is a large scale database including millions or billions of records defining business or other types of transactions or activities. Data warehouses contain a wide variety of data that present a coherent picture of business or organizational conditions over time. Various data analysis and mining tools are provided with the data warehouse to allow users to effectively analyze, manage and access large-scale databases to support management decision making. Data mining is the process of extracting valid and previously unknown information from large databases and using it to make crucial business decisions. In many real-world domains such as marketing analysis, financial analysis, fraud detection, etc, information extraction requires the cooperative use of several data mining operations and techniques. Further details of data warehousing and data transforms, are described in the IBM publications "Managing Visual Warehouse, Version 3.1," IBM document no. GC26-8822-01 (IBM Copyright, January, 1998), which is incorporated herein by reference in its entirety.

Once the desired database tables have been selected and the data to be mined has been identified, transformations on the data may be necessary. In particular, many database tables may not have an optimal design for executing SQL queries. Many database programs, such as the IBM DB2 Universal Database program, provide numerous column functions, also referred to as set or aggregate functions. Column functions operate on a set of values (a column) and reduces a set of values in one or more columns from one or more rows to a single scalar value. Some column functions that perform operations on the rows in a column include average, count, maximum, minimum, standard deviation, sum, variance, etc. These column functions are particularly useful for performing statistical and other analysis on data in a column.

When an enterprise receives data in a spreadsheet or database format, the data may not be arranged in a table/column row format that is suited for application of column functions and other column based analysis, which is one of the more efficient types of SQL data analysis. For instance, data that the user may want to group together for applying column functions and other analysis may be spread out across different columns.

Thus, there is a need in the art for a method and system for transforming database tables in a manner that makes them more efficient to perform analysis.

SUMMARY OF THE PREFERRED EMBODIMENTS

To overcome the limitations in the prior art described above, preferred embodiments disclose a method, system, and program for transforming an input table. The input data table is comprised of multiple columns and rows. For each column, the data from one column in the input table is copied into one row in an output table to invert the input table.

In further embodiments, an input column name parameter indicates a column in the input table. The data in the indicated column is copied to the first row of the output table to form the column names in the output table. Further, the data for each column in the input table excluding the indicated column is copied into one row in the output table following the first row.

In yet further embodiments, a determination is made as to whether the data in the input table columns inverted into the rows in the output table form at least one output table column having a first and second data types, wherein the first and second data types are different. A determination is made as to whether the first and second data types in the output table column are in a promotion path, such that the first data type is capable of being promoted to the second data type. The data in the output table column having the first data type is promoted to the second data type if the first data type is capable of being promoted to the second data type.

Preferred embodiments provide a program for inverting the rows of an input table into columns in an output table. The preferred embodiments are particularly useful in situations where a database user wants to perform column functions, such as averaging, summing, maximum, standard deviation, etc., on values in fields that are spread over a operational changes may be made without departing from the scope of the present invention.

Computing Environment

FIG. 1 illustrates a computing environment 2 in which preferred embodiments are implemented. The environment 2 includes a server 4 and client 6. The server 4 and client 6 would include an operating system, such as MICROSOFT WINDOWS 98 and WINDOWS NT, AIX, OS/390, OS/400, OS/2, and SUN SOLARIS,** and may be comprised of any suitable server and client architecture known in the art. The server 4 and client 6 include a database program 8a and 8b, wherein 8a comprises the server 4 side of the database program and 8b comprises the client 6 side. The server 4 and client 6 may communicate via any communication means known in the art, such as a telephone line, dedicated cable or network line, etc, using any protocol known in the art including TCP/IP network (e.g., an Intranet, the Internet), LAN, Ethernet, WAN, System Area Network (SAN), Token Ring, etc. Alternatively, there may be separate and different networks between the servers 4 and client 6.

The client/server database programs 8a, b, may be comprised of any client/server database program known in the art, such as DB2, Oracle Corporation's ORACLE 8, Microsoft SQL Server,** etc. The database programs 8a and 8b are used to access operations and perform operations with respect to information maintained in one or more databases 10. The database(s) 10 would consist of multiple tables having rows and columns of data, e.g., tables 14 and 18. Further details of the architecture and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

**Microsoft, Windows, Windows NT are registered trademarks and Microsoft SQL Server is a trademark of Microsoft Corporation; DB2, AIX, OS/390, OS/400, and OS/2 are registered trademarks of IBM; and Oracle8 is a trademark of Oracle Corporation; and Solaris is a trademark of Sun Microsystem, Inc. single row. The SQL code needed to apply common column functions to fields in the same row could be quite cumbersome. Preferred embodiments invert the data in rows in an input table to a single column in an output table. By inverting the rows to columns, typical database column function can now be applied to the data in a single column, that was previously spread across different columns in the same row. This would allow the user to apply basic and straightforward SQL commands and column functions to perform the analysis of the fields.

BRIEF DESCRIPTION OF THE DRAWINGS

Referring now to the drawings in which like reference numbers represent corresponding parts throughout:

FIGS. 5, 6, and 7 illustrate examples of the application of invert transform rules to input tables to produce transformed output tables in accordance with preferred embodiments of the present invention.

DETAILED DESCRIPTION OF THE PREFERRED EMBODIMENTS

Figure 1:
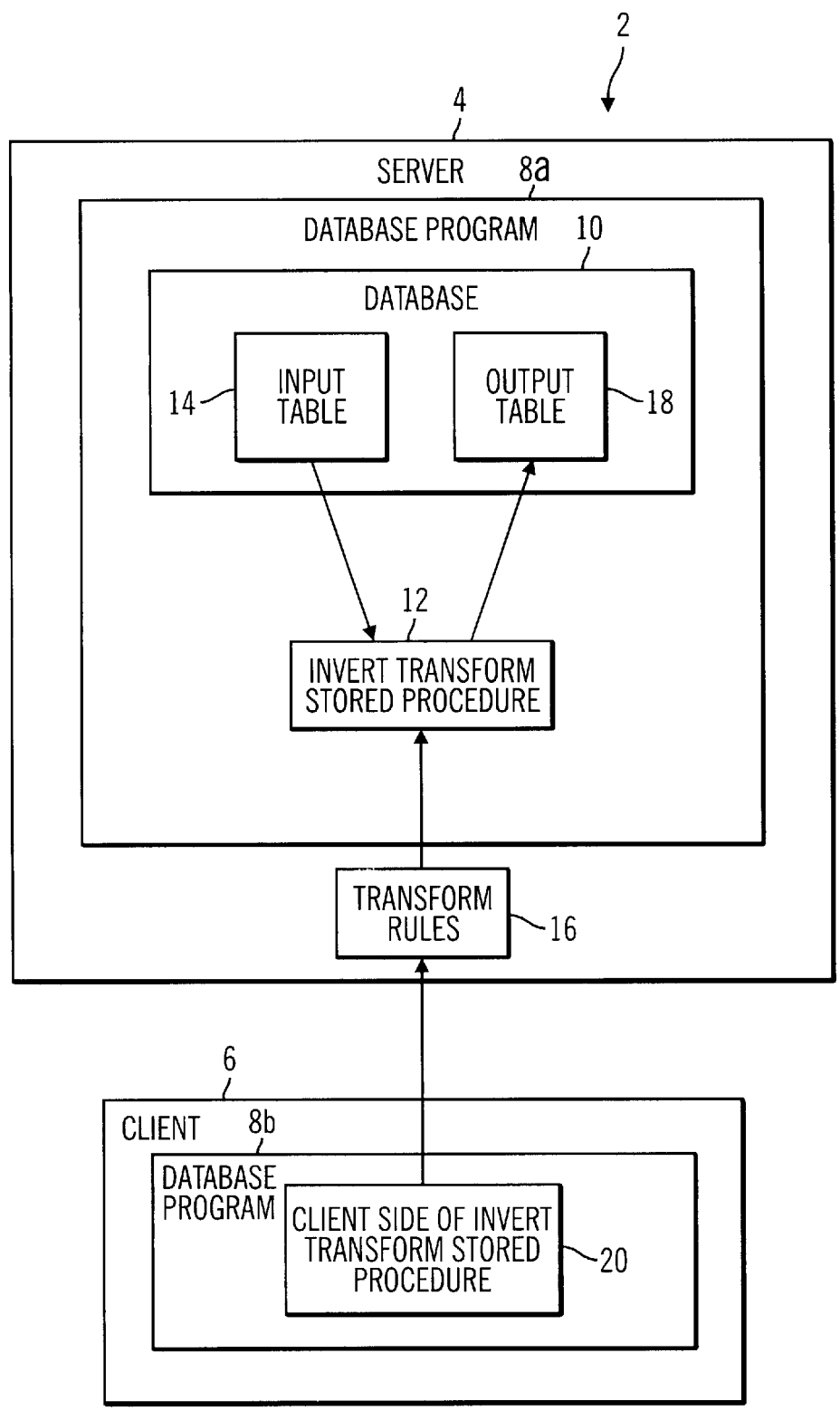
FIG. 1 illustrates a computing environment in which preferred embodiments are implemented.

In the following description, reference is made to the accompanying drawings which form a part hereof and which illustrate several embodiments of the present invention. It is understood that other embodiments may be utilized and structural and In preferred embodiments, the invert transform program is implemented using the IBM stored procedure database program structure. A stored procedure is a block of procedural constructs and embedded SQL statements, i.e., an application program, that is stored in a database and can be called by name. Stored procedures allow an application program to execute in two parts. One part runs on the client and the other on the server. This allows one client call to produce several accesses of the database from the application program executing on the system, i.e., server including the database. Stored procedures are particularly useful to process a large number of database records, e.g., millions to billions of records, without having to transfer data between the server 4 and client 6. The client stored procedure passes input information to the server stored procedure which then, executing within the database program 8 including the database 10, processes numerous database records according to such client input information. The server stored procedure program is initiated by the client, and during execution the client cannot communicate with the stored procedure executing in the server. Further details of stored procedures are described in the publication "A Complete Guide to DB2 Universal Database," "A Complete Guide to DB2 Universal Database," which was incorporated by reference above.

The invert transform of the preferred embodiments is implemented as a stored procedure application program 12 in the server 4. The invert transform stored procedure 12 receives as input name of an input table 14 from the database 10, and transform rules 16 from the client 6 specifying the invert operations to perform on columns in the named input table 14. The results of the invert operations performed by the invert transform stored procedure 12 in response to the transform rules 16 are generated into the output table 18. The client side of the invert transform stored procedure 20 generates the transform rules 16 that specify the invert operations to perform and initiate execution of the invert transform stored procedure 12.

In preferred embodiments, the client side 8b can pass parameters to the invert transform stored procedure 12 as "host variables" or embedded in a CALL statement. In either case, the parameters or transform rules 16 must be specified to control the operation of the invert transform 12.

Structure and Operation of the Invert Transform

A graphical user interface (GUI) at the client 6 may be used to enter various input parameters to control a invert operation. In response to such user input, the client side 20 would generate an application program interface (API) call to the invert transform stored procedure 12 including the parameters shown in FIG. 2 to initiate and control the operation of the invert transform stored procedure 12. The invert parameter fields 50 shown in FIG. 2 includes an input table name 52, output table name 54, log table name 56, run ID 58, data table column name 60, and a sequential number column 66.

A invert operation allows a user to interchange the rows and columns in a table. For instance, if a database table is considered a mathematical matrix, transposing the table is similar to inverting the matrix. Preferred embodiments include a requirement that the data from different rows inverted into the same column be of the same or a promotable type. "Promotable" means that the data type appears in the promotion path of the data type of the column. A promotion type may comprise: small integer to integer to decimal to real to double; character to variable character to long variable character to character large object; graphic to variable graphic to long variable graphic to double byte character large object; etc. For instance, data types can be classified into groups of related data types. Within such groups a precedence order exists where one data type is considered to proceed another data type. The precedence is used to allow the promotion of one data type to a data type later in the ordering.

Figure 2:
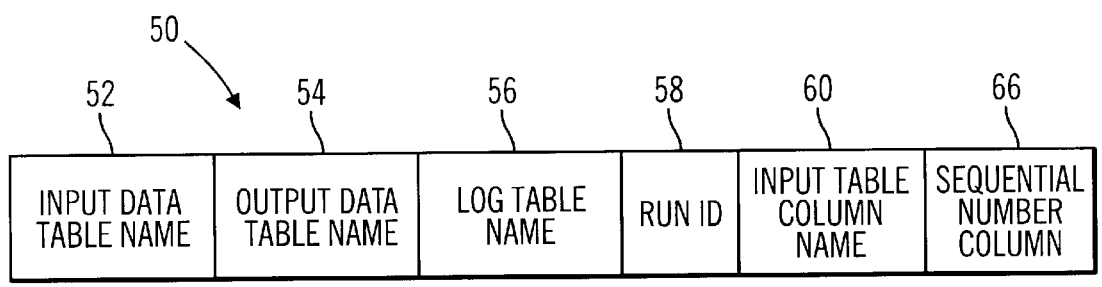
FIG. 2 illustrates the parameters used in a transform command to invert the columns of an input table in accordance with preferred embodiments of the present invention.

With respect to the parameters 50 shown in FIG. 2, the input table name 52 specifies the input table 14 table including the columns subject to the invert operations and the output table name 54 specifies the output table 18 where the inverted columns from the input table 14 are placed. The log table name 56 indicates the name of a log file into which warnings and exceptions that occur during execution of the invert transform stored procedure 12 are stored. The run ID 58 appears in the log file and is used to identify the transform operations for which the log entry was made. The input table column name 58 is an optional parameter indicating an input table column that provides the output table column names. If this parameter is NULL, then the input table is assumed to contain just raw data to be inverted. In such case, the invert transform 12 will create column names based on the sequential numbering of the rows inverted into the columns. The sequential number column 66, if specified, indicates the name of a column in the output table containing sequential numbers starting at one, numbering the rows in the output table comprising the inverted rows of the input table.

Figures 3A, 3B, 3C:
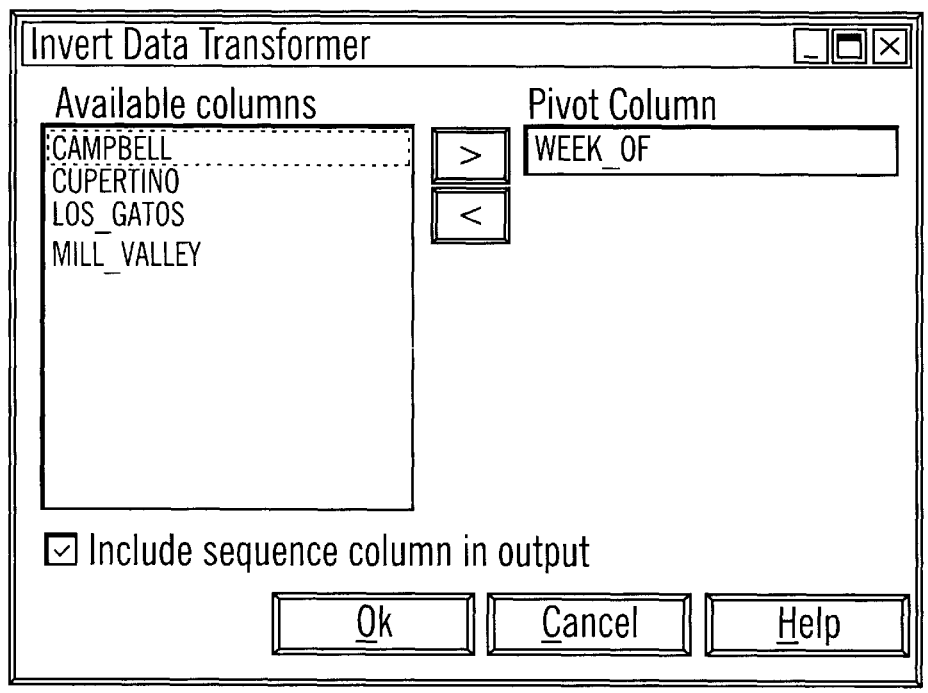
FIGS. 3a, 3b, and 3c illustrate graphical user interfaces (GUI) panels for entering invert transform rules in accordance with preferred embodiments of the present invention.

As discussed the user may enter the parameter information through a graphical user interface (GUI) displayed at the client 6. FIGS. 3a, 3b, and 3c illustrate how a GUI panels 50 in FIG. 3b allowing the user to select the parameters 50 used to construct a rule 16 to invert the input table. FIG. 3a illustrates sample input data. Using the GUI panel 50 shown in FIG. 3b, the user would select the first column in the input table shown in FIG. 3a as the pivot column, and then the invert transform would transform the input table in FIG. 3a to the output table shown in FIG. 3c.

Figure 4A:
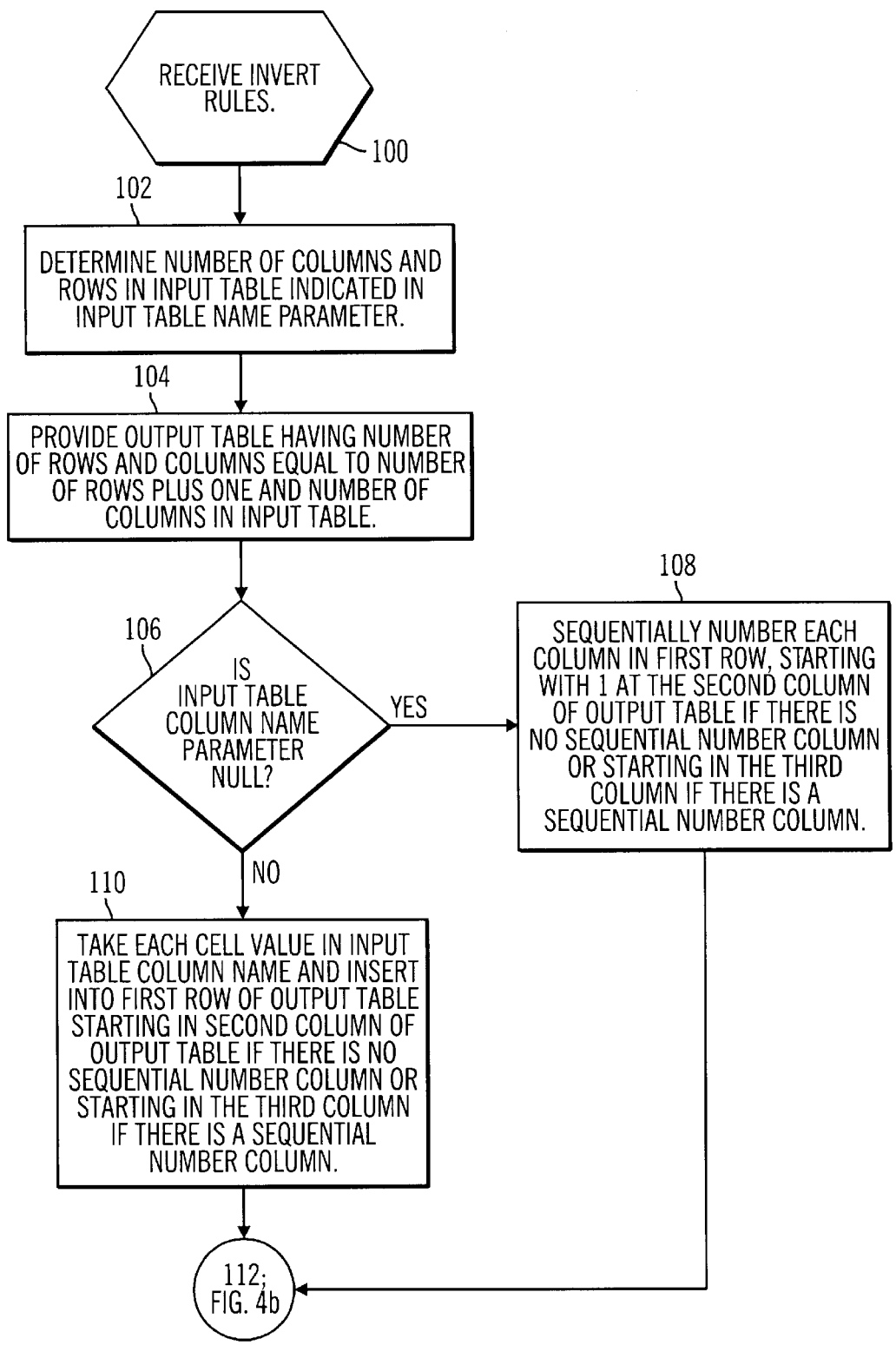
FIGS. 4a and 4b illustrate logic to perform a invert transform operation in accordance with preferred embodiments of the present invention.

FIGS. 4a, b illustrate logic implemented in the invert transform stored procedure 12 to process the transform rules 16 including the optional input table column name 60 and sequential number column 66. Control begins at block 100 with the invert transform 12 receiving client generated invert transform rules 16. The invert transform 12 then determines (at block 102) the number of columns and rows in the input table indicated in the input table name parameter 52. An output table is provided that has a name indicated in the output table name parameter 54, having a number of rows and columns equal to the number of columns and the number of rows plus one, respectively, in the input table. The extra row added to the output table is for column names. The invert transform 12 then determines (at block 106) whether the input table column name parameter 60 is NULL. If so, then the invert transform 12 numbers (at block 108) each column in the first row of the output table sequentially, starting in the second column of output table if there is no sequential number column or starting in the third column if there is a sequential number column. The first or second column in the output table is skipped to account for the fact that the first column in the output table will include the column names in the first row of the input table and thus provide row names and ordering, and not data. Otherwise, if the input table column name parameter 60 is not NULL, then the invert transform 12 takes (at block 110) each cell value in the input table column name and inserts the value for each cell into each cell in the first row of the output table, starting in the second column of the output table if there is no sequential number column or starting in the third column if there is a sequential number column.

Figure 4B:
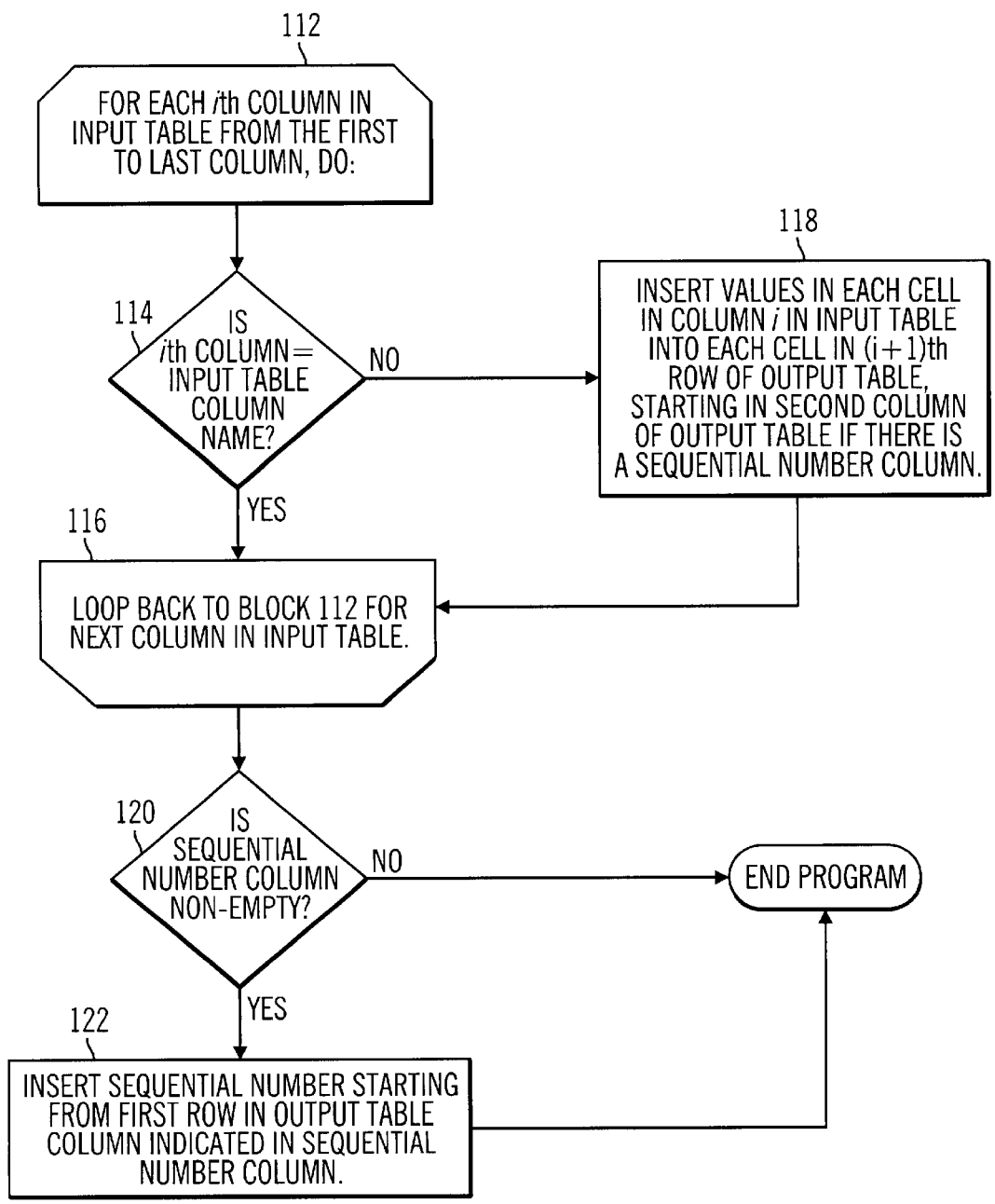

After filling in the column header in the first row of the output table at block 108 or 110, control proceeds to block 112 in FIG. 4b to begin a loop to invert each ith column in the input table, from the first to last column, to a row in the output table. The invert transform 12 first determines (at block 114) whether the ith column in the input table is the column indicated in the input table column name parameter 60. If not, then the invert transform 12 would insert (at block 118) the values for each cell in the ith column in the input table to each cell in the corresponding cell in the (i+1)th row of the output table. The invert transform 12 would insert the columns from the input table in the row of the output table starting in the second column of the (i+1)th row if there is a sequential number column. Otherwise, the column from the input table is inserted in the row, starting from the first column in the (i+1)th row. If the input data column name is the ith column or after inverting column i, the invert transform 12 performs (at block 116) another iteration of the loop at block 112. Further, if the input data column name parameter 60 were NULL, then step 114 would be skipped, and control would proceed to block 118 for every column in the input table. After transforming all columns in the input table to rows in the output table, the invert transform would determine (at block 120) whether the sequential number column 66 parameter was provided with the call to the invert transform 12. If so, the invert transform 12 would insert sequential numbers, starting from one in the second row, to avoid numbering the first row including the column names, and incrementally increasing through each row in the column specified in the parameter 66.

In preferred embodiments, the number of input table rows, which will form the columns in the output table is less than the maximum number of allowable columns in a table. Further if the sequential number column parameter 66 is specified, then the corresponding column in the output table for the sequential numbers must be of an INTEGER data type. Further, if errors occur during inversion, the invert transform 12 will write error information to the log table specified in the log table name parameter 56. The log table would include one column for a time stamp of when the error was detected and at least one other column to record a meaningful error message.

With preferred embodiments, if one column in the output table has data of different promotable data types, then the invert transform 12 will promote the data types in the column earlier in the promotion path to a data type in the column that is the furthest down the promotion path. For instance, assuming a promotion path of small integer to integer to decimal to real to double. If the data in the output column was of a decimal and double data types, then the data in the column of the decimal data type would be promoted to a double data type.

Figure 6:
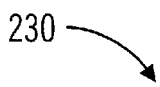

FIGS. 5, 6, and 7 illustrate examples of how the invert transform of the preferred embodiments may be used to alter the structure of the table. FIG. 5 illustrates an input table 200 and an output table 210. The column names in the first row of the input table 200 provide different geographical markets and the second row indicates the data types for each column. The rows for the different dates provide the sales by week for the different markets. However, a financial analyst may want to perform operations on the sales according to week and not market. As discussed, there are numerous columnar functions that are designed to perform operations on columns of data. In such case, the invert transform 12 of the preferred embodiments would convert the rows of weekly data to columns of weekly data on which the columnar functions could be applied. The user would, using a GUI, specify the input table 200 and the output table of weekly sales. The "week of" column 202 in the input table 200 would be specified as the input table column name 60 parameter to use the "week of" dates in the column 202 as the column names in the first row of the output table 210. Certain of the information in the output table 220 would be specified before the transform occurred. For instance, the order column of type INTEGER would have been specified and the name of the first column following the order column is specified as "Location" into which the first row of the input table 200 is inserted. The "week of" data is then placed into the columns following the "Location" column to produce the output table 220. With output table 220, columnar functions can be used to analyze the weekly data in the new columns in the output table.

FIG. 6 provides an output table 230 produced from the input table 200 shown in FIG. 5 that is generated from an inversion where there is no specified input table column name. In such case, the invert transform 12 inserts (at block 108 in FIG. 4a) sequential numbers in the first row as the column headers.

FIG. 7 shows an input table 250 of soy product inventory, where each column indicates a different aspect of the sales of the product indicated in the row, such as units costs and sales revenue. The output table 260 is produced by using the Shelf Item column 252 in the input table as the input table column name 60 parameter to invert into the first row of the output table 260. The sequential number column parameter 66 would be set to NULL indicating no sequential number or order column. In the output table 260, the integer type for the units column in the input table 250 was promoted to DOUBLE, which is a 64 bit double precision floating point number. The units input column can be promoted to a DOUBLE type because INTEGER proceeds DOUBLE in the promotion path, in order, of SMALLINT to INTEGER to DECIMAL to REAL to DOUBLE. The output table 260 would allow one to extract sales information from a row.

With the preferred embodiment, the structure of the database table may be altered to allow a user to alter the table for their specific needs. By inverting the columns to rows, a user may analyze data previously spread across columns in a single row using columnar functions on the single column including the data inverted from multiple columns in a single row.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to specific data structures, such as a rule table having columns of rules, and an arrangement of parameters to provide a vehicle for transferring commands to the invert transform stored procedure program. However, those skilled in the art will recognize that modifications may be made to the architecture of the data structures used to convey invert transform rules and still remain within the scope of the present invention.

Preferred embodiments were described with respect to specific invert operations to groups of aggregated columns into one or more columns in the output table. In further embodiments, other types of rules may be provided and included in the command data structure of the preferred embodiments to perform different types of invert operations to invert data from the input to the output table.

In preferred embodiments, the invert transform program was executed in a stored procedure type program, such as that used in the IBM DB2 database system. However, in further embodiments, different types of application programs, other than stored procedure programs, may be executed in the server 4 or even the client 6 to perform invert operations in accordance with the command data structures of the preferred embodiments.

In preferred embodiments, the input table and output table were included in a database in the server in which the invert transform program is executing. In alternative embodiments, input table and output table may be distributed at different storage locations at different network devices.

Preferred embodiments described particular promotion paths providing an order of related data types. However, the promotion path can comprise any set of data types specified in the system as related and promotable.

In preferred embodiments, a client constructed the invert operation command and communicated such commands to the database server. In alternative embodiments, the invert operation command of the preferred embodiments may be executed on the machine used to construct the command.

In summary, preferred embodiments disclose a method, system, and program for transforming an input table. The input data table is comprised of multiple columns and rows. For each column, the data from one column in the input table is copied into one row in an output table to invert the input table.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transforming an input table comprised of multiple columns and rows, comprising:

copying, for each column, data from one column in the input table into one row in an output table to invert the input table;

determining whether a sequential number column is provided, wherein the data from the column in the input table is copied into the output table row starting from a column following the sequential number column in the output table if the sequential number column is provided; and inserting sequential numbers into the sequential number column in the output table to sequentially number the rows of the output table if the sequential number column is provided.

2. The method of claim 1, wherein an input column name parameter indicates a column in the input table, further comprising copying data in the indicated column to a first row of the output table to form column names in the output table, wherein the data for each column in the input table excluding the indicated column is copied into one row in the output table following the first row.

3. The method of claim 2, wherein the input column name has a NULL value, further comprising generating sequential numbers into columns in the first row of the output table to form column names in the output table, wherein the data for each column in the input table is copied into each row of the output table following the first row.

4. The method of claim 1, wherein a sequential number parameter indicates a column in the output table, further comprising inserting sequential numbers in the column in the output table indicated in the sequential number parameter.

5. The method of claim 1, further comprising:
determining whether the data in the input table columns inverted into the rows in the output table form at least one output table column having a first and second data types, wherein the first and second data types are different;
determining whether the first and second data types in the output table column are in a promotion path, such that the first data type is capable of being promoted to the second data type; and
promoting the data in the output table column having the first data type to the second data type if the first data type is capable of being promoted to the second data type.

6. The method of claim 1, wherein copying the data from one column in the input table to one row in the output table comprises copying the data from the column in the input table into a row starting from a column in the output table following a first column.

7. The method of claim 6, wherein the column in the output table including data from the first row in the input table is provided a column name.

8. A method for transforming an input table comprised of multiple columns and rows, comprising:
determining whether a sequential number column is provided;
copying data from column in the input table into output table row starting from a column following a first two columns if the sequential number column is provided;
copying the data from the column in the input table into the output table row starting from the column following a first column if the sequential number column is not provided; and
inserting sequential numbers into one of the first two columns in the output table to sequentially number the rows of the output table if the sequential number column is provided.

9. A system for transforming an input table comprised of multiple columns and rows, comprising:
means for copying, for each column, data from one column in the input table into one row in an output table to invert the input table;
means for determining whether a sequential number column is provided, wherein the data from the column in the input table is copied into the output table row starting from a column following the sequential number column in the output table if the sequential number column is provided; and
means for inserting sequential numbers into the sequential number column in the output table to sequentially number the rows of the output table if the sequential number column is provided.

10. The system of claim 9, wherein an input column name parameter indicates a column in the input table, further comprising means for copying data in the indicated column to a first row of the output table to form column names in the output table, wherein the data for each column in the input table excluding the indicated column is copied into one row in the output table following the first row.

11. The system of claim 10, wherein the input column name has a NULL value, further comprising means for generating sequential numbers into columns in the first row of the output table to form column names in the output table, wherein the data for each column in the input table is copied into each row of the output table following the first row.

12. The system of claim 9, wherein a sequential number parameter indicates a column in the output table, further comprising means for inserting sequential numbers in the column in the output table indicated in the sequential number parameter.

13. The system of claim 9, further comprising:
means for determining whether the data in the input table columns inverted into the rows in the output table form at least one output table column having a first and second data types, wherein the first and second data types are different;
means for determining whether the first and second data types in the output table column are in a promotion path, such that the first data type is capable of being promoted to the second data type; and
means for promoting the data in the output table column having the first data type to the second data type if the first data type is capable of being promoted to the second data type.

14. The system of claim 9, wherein copying the data from one column in the input table to one row in the output table comprises means for copying the data from the column in the input table into a row starting from a column in the output table following a first column.

15. A system for transforming an input table comprised of multiple columns and rows, comprising:
means for determining whether a sequential number column is provided;
means for copying data from column in the input table into output table row starting from a column following a first two columns if the sequential number column is provided;
means for copying the data from the column in the input table into the output table row starting from the column following the first column if the sequential number column is not provided; and
means for inserting sequential numbers into one of the first two columns in the output table to sequentially number the rows of the output table if the sequential number column is provided.

16. An article of manufacture for use in transforming an input table in a database comprised of multiple columns and rows, the article of manufacture comprising computer usable media including at least one computer program embedded therein that causes the computer to perform:
copying, for each column, data from one column in the input table into one row in an output table to invert the input table;

determining whether a sequential number column is provided, wherein the data from the column in the input table is copied into the output table row starting from a column following the sequential number column in the output table if the sequential number column is provided; and inserting sequential numbers into the sequential number column in the output table to sequentially number the rows of the output table if the sequential number column is provided.

17. The article of manufacture of claim 16, wherein an input column name parameter indicates a column in the input table, further comprising copying data in the indicated column to a first row of the output table to form column names in the output table, wherein the data for each column in the input table excluding the indicated column is copied into one row in the output table following the first row.

18. The article of manufacture of claim 17, wherein the input column name has a NULL value, further comprising generating sequential numbers into columns in the first row of the output table to form column names in the output table, wherein the data for each column in the input table is copied into each row of the output table following the first row.

19. The article of manufacture of claim 16, wherein a sequential number parameter indicates a column in the output table, further comprising inserting sequential numbers in the column in the output table indicated in the sequential number parameter.

20. The article of manufacture of claim 16, further comprising:

determining whether the data in the input table columns inverted into the rows in the output table form at least one output table column having a first and second data types, wherein the first and second data types are different;

determining whether the first and second data types in the output table column are in a promotion path, such that the first data type is capable of being promoted to the second data type; and promoting the data in the output table column having the first data type to the second data type if the first data type is capable of being promoted to the second data type.

21. The article of manufacture of claim 16, wherein copying the data from one column in the input table to one row in the output table, comprises copying the data from the column in the input table into a row starting from a column in the output table following a first column.

22. An article of manufacture for use in transforming an input table in a database comprised of multiple columns and rows, the article of manufacture comprising computer usable media including at least one computer program embedded therein that causes the computer to perform:

determining whether a sequential number column is provided;

copying data from column in the input table into output table row starting from a column following a first two columns if the sequential number column is provided;

copying the data from the column in the input table into the output table row starting from the column following the first column if the sequential number column is not provided; and inserting sequential numbers into one of the first two columns in the output table to sequentially number the rows of the output table if the sequential number column is provided.

* * * * *

UNITED STATES PATENT AND TRADEMARK OFFICE
CERTIFICATE OF CORRECTION

PATENT NO. : 6,748,389 B1 Page 1 of 1
DATED : June 8, 2004
INVENTOR(S) : Mark Anthony Cesare, Julie Ann Jerves and Richard Henry Mandel III It is certified that error appears in the above-identified patent and that said Letters Patent is hereby corrected as shown below:

Column 3,
Line 29 starting with "single row. The SQL code..." to line 55, ending with "the present invention.", move all to Column 2, line 55-56 after "spread over a".

Signed and Sealed this

Thirteenth Day of June, 2006

JON W. DUDAS
*Director of the United States Patent and Trademark Office*